Figure 1:
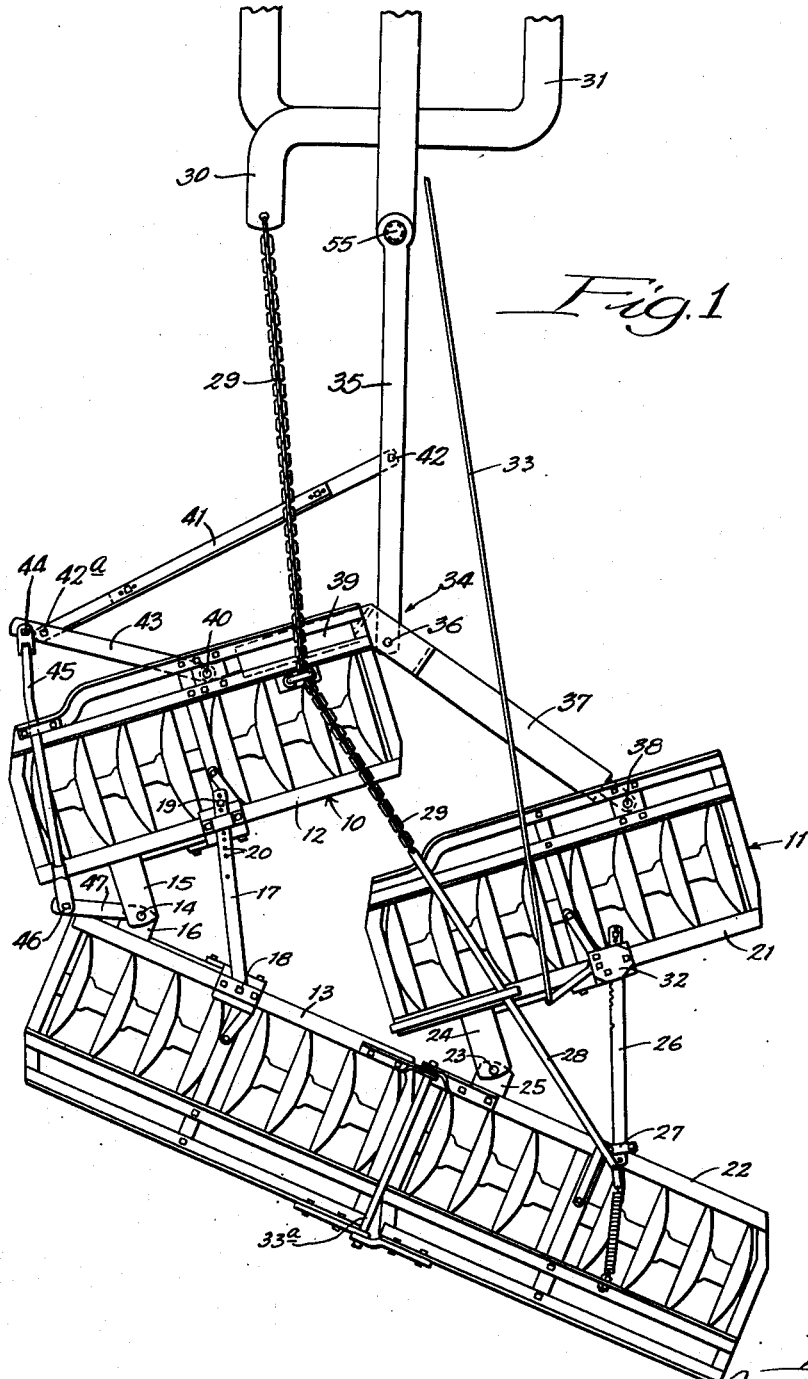

May 30, 1944.　　　　J. V. DYRR　　　　2,349,852
HARROW
Filed Feb. 13, 1943　　　　2 Sheets-Sheet 1

Inventor
Jacob V. Dyrr,
By Paul O. Pippel
Attorney.

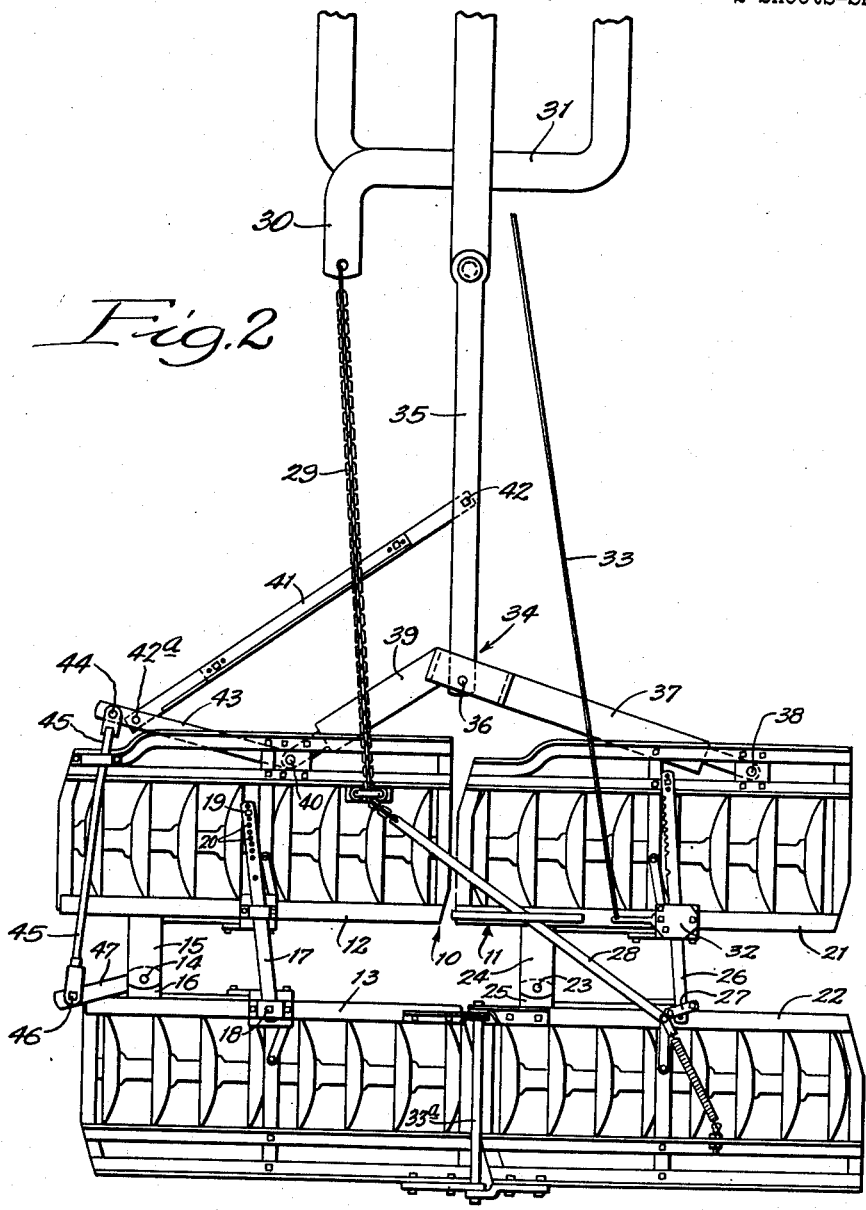

Patented May 30, 1944

2,349,852

UNITED STATES PATENT OFFICE 2,349,852

HARROW

Jacob V. Dyrr, Bell, Calif., assignor to International Harvester Company, a corporation of New Jersey Application February 13, 1943, Serial No. 475,699

9 Claims. (Cl. 55—83)

This invention relates to a harrow. More specifically it relates to a hitch structure for a squadron harrow.

It has been known to provide squadron harrows composed of offset harrows connected in side-by-side relationship, and in some cases the rear gangs are connected with one another so as to be held in alinement. The drawback of harrows of these types is that the hitch quite often is large and complicated. Thus, the cost of the hitch may be increased and the control and operation of the harrow may be difficult.

It has also been known to provide squadron harrows with a close-coupled hitch, but the drawback here has been that the shifting of the gangs between working position and transport position and vice versa has required a material angular shifting of the hitch frame with respect to the harrow gangs. This necessitated an endwise shifting of the gangs, which is difficult.

The present invention has to do with a special form of close-coupled hitch frame for an offset-harrow squadron which will not shift materially angularly with respect to the direction of movement of the harrow squadron in shifting of the squadron between working position and transport position.

An object of the present invention is to provide an improved earth-working-tool construction.

Another object is the provision of an improved hitch construction.

A further object is to provide an improved close-coupled hitch construction for an earth-working device.

Still another object of the present invention is to provide an improved harrow construction.

A still further object is the provision of an improved squadron harrow.

Another object is to provide an improved hitch construction for harrows.

A still further object is the provision of an improved hitch structure for squadron harrows.

Another object is to provide an improved close-coupled hitch for an offset-harrow squadron.

Other objects will appear from the disclosure.

According to the present invention, a squadron harrow composed of two offset harrows, the rear gangs of which are held in alinement, is pivotally connected to a hitch structure which is in turn pivotally connected to a tractor. The hitch structure is short and compact and is directly coupled to the squadron harrow. It is so constructed and connected to the harrow that in shifting of the gangs from working position to transport position, the hitch and, more particularly, a longitudinal member thereof does not shift with respect to the direction of movement of the harrow. The longitudinal member remains approximately coincident with the direction of movement of the harrow squadron.

In the drawings:

Figure 1 is a plan view of a squadron harrow in working position, the harrow having the novel hitch structure of the present invention; and Figure 2 is a plan view of the harrow and hitch structure of Figure 1 in transport position.

Figures 1 and 2 show a squadron harrow composed of a pair of offset harrows 10 and 11. The offset harrow 10 is composed of a front gang 12 and a rear gang 13 pivotally connected at 14 by means of pieces 15 and 16 extending respectively rearwardly and forwardly from the front gang 12 and rear gang 13. A bar 17 is pivotally connected at 18 to the rear gang 13 and carries a bolt 19, which may be inserted in any one of a plurality of holes 20 to limit the extent of angular movement between the gangs. The offset harrow 11 is composed of a front gang 21 and a rear gang 22 pivotally connected at 23 by means of pieces 24 and 25 extending rearwardly and forwardly, respectively, from the front gang 21 and the rear gang 22. The angular position of the gangs 21 and 22 is controlled by means of a bar 26, which is releasably connected by a means indicated at 27 to the rear gang 22. The means 27 is under the control of a rod 28 connected to a chain 29 connected in turn to an offset extension 30 of a draft bar 31 of a tractor, not shown. The means 27 is not shown in detail, since it forms no part of the present invention but is shown more clearly in applicant's copending application Serial No. 463,945, filed October 30, 1942. It is sufficient to state that pull upon the means 27 is caused by a turn to the right, the pull being exerted through the offset extension 30, the chain 29, and the rod 28 so as to release the means 27 and to allow the bar 26 to move rearwardly with respect to the rear gang 22. The forward end of the bar 26 is releasably connected by means indicated by numeral 32 under the control of a cord 33 extending within easy reach of an operator upon the tractor. This means is not shown in detail in the present application, since it forms no part of the invention of the present application but is more fully shown and claimed in applicant's copending application, Serial No. 463,946, filed October 30, 1942. It may be stated that pull upon the cord 33 releases the means 32 so that the bar 26 may move forwardly with respect to the front gang 21 for adjustment of the gangs to transport position, as shown in Figure 2. The rear gangs 13 and 22 are pivotally connected by a rod 33a so as to be held in alinement.

There is connected to the front gangs 12 and 21 a hitch structure 34. This hitch structure 34 is composed of a member 35 pivotally connected at 36 to a member 37. The member 37 is pivotally connected at 38 directly to the front gang 21. There is secured to the member 37 a member 39 which is pivotally connected at 40 directly to the front gang 12. An extensible member 41 is connected at one end with a midpoint 42 of the member 35. The other end of the member 41 is pivotally connected at 42a adjacent one end of a member 43 which has its other end pivotally connected to the front gang 12 at 40, the point of connection of the member 39 with the front gang 12. At a point 44 at one end of the member 43 adjacent the point 42a is pivotally connected the front end of a pull bar 45, which has its rear end pivotally connected at 46 to a part 47 secured to the part 16 attached to the rear gang 13.

It will be observed that the hitch structure 34 is short and directly or close-coupled to the harrow squadron. The hitch structure has sufficient flexibility by virtue of the members 41 and 43 and the pull bar 45 that there is not a material anguluar shifting of the member 35 of the hitch structure 34 with respect to the direction of movement of the harrow squadron in movement of the harrow gangs from working position to transport position. This will be noted from a comparison of Figures 1 and 2. Figure 1 shows that in working position the member 35 is approximately in the direction of movement of the harrow squadron. Figure 2 shows that in transport position the member 35 is in about the same position with respect to the direction of movement. Since the position of the member 35 is maintained in both positions, there is substantially no endwise shifting of the harrow gangs. Of course, such endwise shifting would entail considerable effort. The hitch structure 34 also has the advantage of tending to pull the harrow gangs into working position in heavy soil. This is due to the longitudinal pull member 45 connected to the rear gangs, for the greater the pull exerted upon the pull member 45 by the heavy soil, the greater the tendency to swing the rear gangs fully into working position.

It will be observed that the hitch structure is short and compact and is directly coupled to the front gangs 12 and 21 at the points 40 and 38. It should also be noted that the members 37 and 39 secured to one another are angularly related so as to present a rear edge or portion of the hitch structure set back from a straight line joining the points 40 and 38. Thus, there is room for the gang 12 in the full working position of Figure 1, and in this position the member 39 actually extends along and beneath the forward portion of one end of the gang 12. The member 39 serves as a limit to the working position of the front gang 12.

It will be apparent from the foregoing description that there has been provided an improvement in a close-coupled hitch structure.

The intention is to limit the invention only within the scope of the appended claims.

What is claimed is:

1. The combination with a pair of devices connected side by side and each composed of front and rear earth-working tools movably connected to one another, of a hitch structure for the devices comprising a first member pivotally connected at its ends to the front tools of the devices, a second member pivotally connected at one end and at an intermediate point of the first member and adapted to be pivotally connected at its other end to a pulling means, a third member pivotally connected at one end to the front tool of one device adjacent the connection of the first member to the same front tool, a fourth member pivotally connected at one end to the other end of the third member and at its other end to an intermediate point of the second member, and a fifth member secured to one rear tool and pivotally connected to one of the last-mentioned members adjacent their point of connection with one another.

2. The combination with a pair of devices connected side by side and each composed of front and rear earth-working tools movably connected to one another, of a hitch structure for the devices comprising a first member shaped to provide between its ends a portion set back from a straight line joining the ends to allow room for the front tool of one device in full working position and being pivotally connected at its ends to the front tools of the devices, a second member pivotally connected at one end at an intermediate point of the first member and adapted to be pivotally connected at its other end to a pulling means, a third member pivotally connected at one end to the front tool of one device adjacent the connection of the first member to the same front tool, a fourth member pivotally connected at one end to the other end of the third member and at its other end to an intermediate point of the second member, and a fifth member secured to one rear tool and pivotally connected to one of the last-mentioned members adjacent their point of connection with one another.

3. The combination with a pair of devices connected side by side and each composed of front and rear earth-working tools movably connected to one another, of a hitch structure for the devices comprising a first member composed of two straight-line portions intersecting at a point set back from a straight line joining the two ends of the first member to provide room for the front tool of one device in full working position and being pivotally connected at its ends to the front tools of the devices, a second member pivotally connected at one end at an intermediate point of the first member and adapted to be pivotally connected at its other end to a pulling means, a third member pivotally connected at one end to the front tool of one device adjacent the connection of the first member to the same front tool, a fourth member pivotally connected at one end to the other end of the third member and at its other end to an intermediate point of the second member, and a fifth member secured to one rear tool and pivotally connected to one of the last-mentioned members adjacent their point of connection with one another.

4. The combination with a squadron harrow comprising a pair of offset harrows each composed of front and rear gangs movably connected to one another, of a hitch structure for the squadron harrow comprising a first member pivotally connected at its ends to the front gangs, a second member pivotally connected at one end at an intermediate point of the first member and adapted to be pivotally connected at its other end to a pulling means, a third member pivotally connected at one end to the front gang of one offset harrow adjacent the connection of the first member to the same front gang, a fourth member pivotally connected at one end to the other end of the third member and at its other end to an intermediate point of the second member, and a fifth member secured to one rear gang and pivotally connected to one of the last two mentioned members adjacent their connection with one another.

5. The combination with a quadron harrow comprising a pair of offset harrows each composed of front and rear gangs movably connected to one another, of a hitch structure for the squadron harrow comprising a first member shaped to provide between its ends a portion set back from a straight line joining the ends to allow room for the front gang of one offset harrow in full working position and being pivotally connected at its ends to the front gangs, a second member pivotally connected at one end at an intermediate point of the first member and adapted to be pivotally connected at its other end to a pulling means, a third member pivotally connected at one end to the front gang of one offset harrow adjacent the connection of the first member to the same front gang, a fourth member pivotally connected at one end to the other end of the third member and at its other end to an intermediate point of the second member, and a fifth member secured to one rear gang and pivotally connected to one of the last two mentioned members adjacent their connection with one another.

6. The combination with a squadron harrow comprising a pair of offset harrows each composed of front and rears gangs movably connected to one another, of a hitch structure for the squadron harrow comprising a first member composed of two straight-line portions intersecting at a point set back from a straight line joining the two ends of the first member to provide room for the front gang of one offset harrow in full working position and being pivotally connected at its ends to the front gangs, a second member pivotally connected at one end at an intermediate point of the first member and adapted to be pivotally connected at its other end to a pulling means, a third member pivotally connected at one end to the front gang of one offset harrow adjacent the connection of the first member to the same front gang, a fourth member pivotally connected at one end to the other end of the third member and at its other end to an intermediate point of the second member, and a fifth member secured to one rear gang and pivotally connected to one of the last two mentioned members adjacent their connection with one another.

7. The combination with a squadron harrow comprising a pair of offset harrows each composed of front and rear gangs movably connected to one another and means connecting the rear gangs and holding them in alinement, of a hitch structure for the squadron harrow comprising a first member pivotally connected at its ends to the front gangs, a second member pivotally connected at one end at an intermediate point of the first member and adapted to be pivotally connected at its other end to a pulling means, a third member pivotally connected at one end to the front gang of one offset harrow adjacent the connection of the first member to the same front gang, a fourth member pivotally connected at one end to the other end of the third member and at its other end to an intermediate point of the second member, and a fifth member pivotally connected to one of the last two mentioned members adjacent their connection with one another and secured to one rear gang.

8. The combination with a squadron harrow comprising a pair of offset harrows each composed of front and rear gangs movably connected to one another and means connecting the rear gangs and holding them in alinement, of a hitch structure for the squadron harrow comprising a first member shaped to provide between its ends a portion set back from a straight line joining the ends to allow room for the front gang of one offset harrow in full working position and being pivotally connected at its ends to the front gangs, a second member pivotally connected at one end at an intermediate point of the first member and adapted to be pivotally connected at its other end to a pulling means, a third member pivotally connected at one end to the front gang of one offset harrow adjacent the connection of the first member to the same front gang, a fourth member pivotally connected at one end to the other end of the third member and at its other end to an intermediate point of the second member, and a fifth member pivotally connected to one of the last two mentioned members adjacent their connection with one another and secured to one rear gang.

9. The combination with a squadron harrow comprising a pair of offset harrows each composed of front and rear gangs movably connected to one another and means connecting the rear gangs and holding them in alinement, of a hitch structure for the squadron harrow comprising a first member composed of two straight-line portions intersecting at a point set back from a straight line joining the two ends of the first member to provide room for the front gang of one offset harrow in full working position and being pivotally connected at its ends to the front gangs, a second member pivotally connected at one end at an intermediate point of the first member and adapted to be pivotally connected at its other end to a pulling means, a third member pivotally connected at one end to the front gang of one offset harrow adjacent the connection of the first member to the same front gang, a fourth member pivotally connected at one end to the other end of the third member and at its other end to an intermediate point of the second member, and a fifth member pivotally connected to one of the last two mentioned members adjacent their connection with one another and secured to one rear gang.

JACOB V. DYRR.